May 26, 1931.  E. A. FORSHEY  1,807,520

DIAGNOSTIC INSTRUMENT

Filed May 27, 1927

Inventor

Elmore A. Forshey.

By Harry H. Styll.

Attorney

Patented May 26, 1931

1,807,520

UNITED STATES PATENT OFFICE

ELMORE A. FORSHEY, OF NEW YORK, N. Y., ASSIGNOR TO AMERICAN OPTICAL COMPANY, OF SOUTHBRIDGE, MASSACHUSETTS, A VOLUNTARY ASSOCIATION OF MASSACHUSETTS

DIAGNOSTIC INSTRUMENT

Application filed May 27, 1927. Serial No. 194,825.

This invention relates to diagnostic instruments and has particular reference to improvements in a diagnostic instrument for throwing a ray of light to illuminate the part under examination.

The principal object of the invention is to provide a fixation object on the instrument which may be observed by the patient while the eye under observation is being examined.

Another object of the invention is to provide fixation objects in such an instrument which may be equally well read from the left hand as from the right hand with means for moving the said fixation object from one side of the instrument to the other.

Another object of the invention is to provide such fixation objects of various colors and conformations as may be of assistance in holding the attention of the patient.

Another object of the invention is to provide simple and efficient means of illuminating the said fixation objects, preferably with illumination from a source of illumination that is used for the examination being made by the instrument.

Other objects and advantages of the invention will become apparent from the following description taken in connection with the accompanying drawings, and it will be understood that many changes in the construction and arrangements of parts may be made without departing from the spirit of the invention as expressed by the accompanying claims. I, therefore, do not wish to be limited to the exact details shown, the preferred forms only having been shown by way of illustration.

Referring to the drawings.

Figure 1:
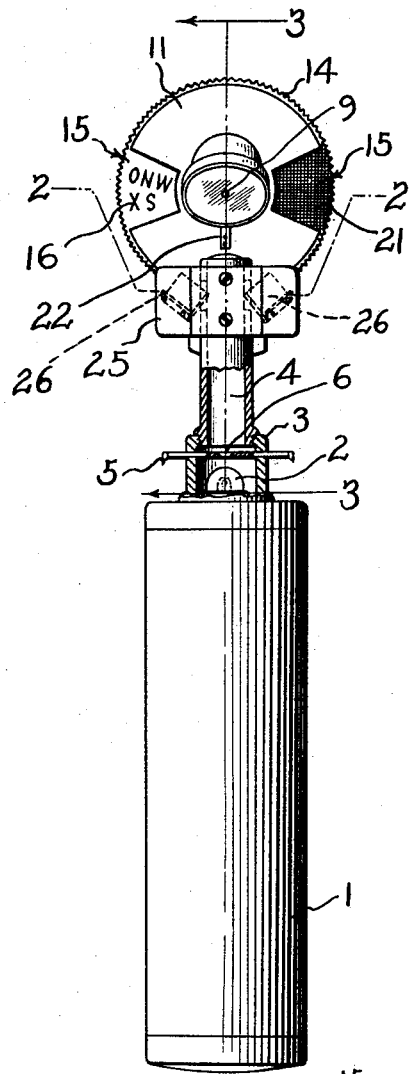
Fig. 1 is an elevation partially in section of a retinoscope embodying the invention.

This invention relates particularly to what may be termed a dynamic retinoscope or ophthalmoscope. Such instruments are used by oculists for throwing a beam of light into the patient's eye which is to be examined. It has been found from practise that there are two main or general tests that may be made in this way; first, examining the eye while it is in motion; and second, examining the eye while it is at rest. This latter is known as a dynamic test, and it is this type of test to which my invention is particularly applicable. In order, then, to fix the eye of the patient while being examined I provide means on the face of the instrument which the patient may fix with his eye, thus holding his eye steady during the examination, and I provide means of illuminating the said object so that it may be clearly seen by the patient.

Referring to the drawings wherein similar references are used to denote corresponding parts throughout, I have shown my invention as employed on an electrically illuminated retinoscope of the usual type having the handle 1 which is supplied with a source of electric energy, such as a connection to an electric circuit or an electric battery. On the handle 1 is carried an electric lamp 2 in the light conducting member 3 having the light channel 4. Across the member 3 is a diaphragm plate 5 having a plurality of openings 6 for regulating the amount of light that is transmitted along the light passage-way 4. The plate 5 is in the form of a slide which may be moved back and forth in the member 3 to bring the desired opening in line with the light. At the top of the light tube 4 is a condensing lens 7. In line with the light tube and condensing lens is a reflector 8 having a peep opening 9 therethrough. This reflector 8 receives the light through the tube 4 from the lamp 2 and reflects it into the eye of the patient. In line with the peep opening 9 is a second peep opening 10 through which the operator looks into the patent's eye.

Secured to the outside of the light tube 4 is a bracket plate 11 to which the reflector 8 is secured. On the back of the plate 11 I mount the fixation disc 12 which is rotatable on the pivot 13. The disc 12 has knurled or toothed edges 14 by which it may be turned.

On each side of the bracket plate 11 I cut out openings 15 through which the fixation objects 16 on the disc 12 may be viewed. These fixation objects as shown in Figs. 4 and 5 may be of various types, and they are preferably of such a type that they may be read equally as well from the right hand as from the left hand.

Figure 4:
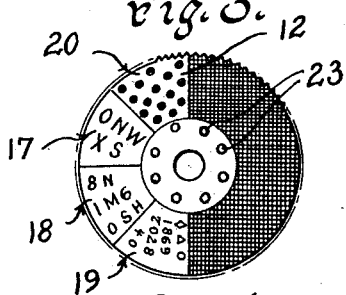
Fig. 4 is a front view of the fixation disc when used on the left hand side.
Figure 5:
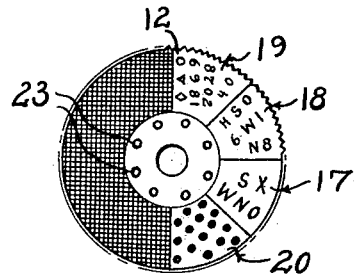
Fig. 5 is a front view of the fixation disc when used on the right hand side.

In Fig. 4 the fixation objects marked 17 are letters. Those marked 18 are a combination of letters and figures, and those marked 19 are a combination of letters, figures and objects, while those marked 20 are a combination of figures. These figures, letters and objects if desired may be made of different colors, such as red and black. They may be alternate or arranged in any desired manner.

It will be noted that in Fig. 1 while the fixation objects 16 are visible in the opening 15 on the left hand side there is a blank space 21 on the disc 12 in line with the right hand opening 15. This is preferably darkened or made black. The disc 12 may be rotated so as to bring any line of objects, either 17, 18, 19 or 20, in line with the opening 15 either on the right hand or left hand side, as desired. When the fixation objects appear on one side the black or blank space appears upon the other side of the instrument. There is a spring clip 22 having a portion aligning itself with indents 23 in the disc 12 so that when the fixation objects are in line with the opening 15 the spring holds the disc securely in that position, it being understood, of course, that the spring pressure is only sufficient to hold it against displacement but that the wheel may be rotated against such spring pressure when desired.

Figure 2:
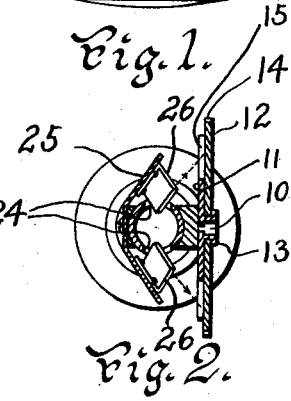
Fig. 2 is a cross section on line 2—2 of Fig. 1.
Figure 3:
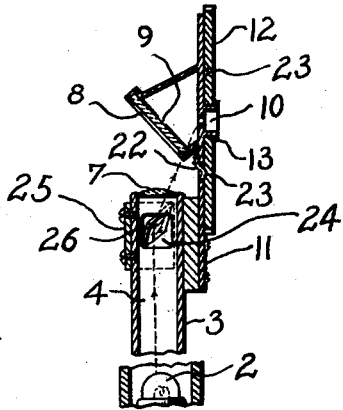
Fig. 3 is a partial cross section on line 3—3 of Fig. 1.

As the instrument is very often used in a dark room it is desirable that the fixation objects be illuminated when used on the right hand side and on the left hand side, and to accomplish this from the one source of illumination, the electric lamp 2, openings 24 are cut in the sides of the tube 4 adjacent its terminal end. Over the tube 4 and covering the openings 24 I place a shield plate 25 which prevents the patient from seeing the illumination from the openings 24. Attached to the shield plate 25 are reflectors 26 which direct the light from the lamp 2 coming through the tube 4 and the openings 24 onto the fixation objects which are aligned either on one side or the other at the openings 15, as is clearly shown in Fig. 2.

The operation is as follows: The switch is turned on to illuminate the bulb 2. The instrument is brought in line with the patient's eye so that the operator may look through the peep openings 9 and 10 in the patient's eye. This aligns the fixation objects 16 with the patient's eye and in close proximity thereto. This insures that the operator may look into the patient's eye directly instead of at an angle. The patient is directed to fix his eye on the fixation object either on the right hand side or the left hand side as the operator has pre-arranged the fixation characters.

The light coming from the lamp 2, going through the tube 4 and the condensing lens 7 will be directed into the patient's eye, while a portion of the light will go through the openings 24, strike the reflectors 26 and be reflected onto the fixation object to illuminate it for the patient's vision. The fixation object on the disc 12 may be turned by the knurled edges 14 to bring any desired fixation character into line either on one side of the instrument or the other and the spring 22 will hold the disc in aligned position with the fixation object.

From the foregoing description it will be seen that I have provided simple, efficient and economical means for obtaining the objects and advantages of the invention in that I have provided an adjustable fixation object which may be illuminated from the same source of illumination as that which illuminates the patient's eye.

Having described my invention, I claim:

1. In a device of the character described, a source of light, a member having a light passage way leading from the source of light and having an opening therethrough on each side of the axis of the light passage way, a reflector support carried by the member having the light passage way, a reflector on the support aligned with the light passage way, test objects on the reflector support on each side of the reflector, and additional reflectors, one in the path of the light rays coming thru each opening thru the light passageway and adapted to reflect said light onto the test characters on their respective sides of the reflector support.

2. In a device of the character described, a source of light, a member having a light passage way leading from the source of light and having an opening therethrough on each side of the axis of the light passage way, a reflector support carried by the light passage way member, a reflector on the support aligned with the light passage way, a test chart rotatably mounted on the reflector support having test objects on one side thereof and a blank space on the other side to show said test objects on each side of the reflector, upon rotation of the test chart and additional reflectors, one in the path of the light rays coming thru each opening thru the light passageway and adapted to simultaneously reflect light coming through said openings onto the test characters showing on one side of the reflector support and onto the blank space for the test characters on the other side of the reflector support.

3. In a device of the character described, a source of light, a member having a light passage way leading from the source of light, a reflector support carried by the light passage way member, a reflector on the support aligned with the light passage way, rotatable test characters carried by the reflector support and rotatable in the plane of said support and arranged to show on each side of the reflector.

4. In a device of the character described, a source of light, a member having a light passage way leading from the source of light, a reflector support carried by the light passage way member and having a window recess on each side of the axis of the light passage way, a reflector on the support between the window recesses and aligned with the light passage way, and a test character dial rotatably mounted on the reflector support and adapted to present test characters at a window recess on each side of the reflector, the dial being so arranged that when test characters are showing at one window recess the other window recess is blank as to test characters.

5. In a device of the character described, a source of light, a member having a light passageway leading from the source of light and having a transverse opening therethrough, a reflector support carried by the light passageway member, a reflector on the support aligned with the light passageway, test characters positioned out of line with the light emerging thru the transverse opening through the light passageway and a second reflector positioned in line with the light emerging thru the transverse opening in the light passageway so as to reflect said light on to said test characters.

6. In a device of the character described, a source of light, a member having a light passageway leading from the source of light and having a plurality of transverse openings therethrough, a reflector support carried by the light passageway member, a reflector on the support aligned with the light passageway, test characters positioned out of line with the light emerging thru the transverse openings through the light passageway, and additional reflectors, one positioned in line with the light emerging thru each of the transverse openings in the light passage way so as to reflect light emerging from said openings onto the test characters.

7. In a device of the character described, a source of light, a member having a light passageway leading from the source of light and having a plurality of transverse openings therethrough, one on each side of the light passageway, a reflector support carried by the light passageway member, a reflector on the support aligned with the light passageway and test characters arranged to show on each side of the reflector and to be illuminated by light emerging thru the transverse openings on each side of the light passageway.

8. In an optical instrument, a source of light, a member having a light passageway leading from the source of light, a rotatable test object having test characters thereon and a shield member over the test object having a plurality of openings thru which the test characters are visible, the test characters being so arranged that the test characters are visible at one of said openings only at any one time.

ELMORE A. FORSHEY.